United States Patent
Mori et al.

(10) Patent No.: US 6,917,822 B1
(45) Date of Patent: Jul. 12, 2005

(54) MOBILE RADIO TERMINAL, AND METHOD FOR DISPLAYING DATA IN MOBILE RADIO TERMINAL

(75) Inventors: Shinichiro Mori, Kawasaki (JP); Masayuki Hirose, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 09/712,682

(22) Filed: Nov. 14, 2000

(30) Foreign Application Priority Data

Feb. 28, 2000 (JP) .......................... 2000-052367

(51) Int. Cl.⁷ ................................. H04Q 7/20
(52) U.S. Cl. ....................... 455/564; 455/566
(58) Field of Search ................... 455/566, 556.1, 455/556.2, 550.1, 569; 379/93.23, 93.12

(56) References Cited

U.S. PATENT DOCUMENTS 5,923,736 A  *  7/1999  Shachar .................. 379/93.17

* cited by examiner

*Primary Examiner*—Nick Corsaro
*Assistant Examiner*—Philip J. Sobutka
(74) *Attorney, Agent, or Firm*—Katten Muchin Zavis Rosenman

(57) ABSTRACT

A mobile radio terminal, such as mobile telephone, equipped with a call-out detecting section for detecting a call-out operation to a destination terminal of telephone number information attached to data being displayed on a data display section, a call-out control section, responsive to the detection of the call-out operation, for executing a call-out process based on the telephone number information, and a display control section for controlling the data display section to display the data after the call-out control section starts executing the call-out process. When the user of the source terminal, such as mobile telephone, makes a call-out on the telephone number information attached to the data displayed on the source terminal, the user can enjoy talking with a companion person on the destination terminal while looking through the data displayed on the data display section.

10 Claims, 6 Drawing Sheets

MOBILE RADIO TERMINAL, AND METHOD FOR DISPLAYING DATA IN MOBILE RADIO TERMINAL

BACKGROUND OF THE INVENTION

1. Field of the Invention

The present invention relates to a mobile radio terminal and a method for displaying data in the mobile radio terminal.

2. Description of the Related Art

Nowadays, with a drastic spread of mobile telephones, various services have started to provide for subscribers via mobile telephones. Latest mobile telephones are used for not only voice-communication but also data-communication, such as transmitting and receiving e-mails, and browsing the information (contents) of URLs (Uniform Resource Locations) in the form of HTML (Hyper Text Markup Language) documents over the Internet (WWW (World Wide Web)).

Such data-communicable modern mobile telephone temporarily stores received e-mails and documents, which have been obtained by browsing the Internet (WEB data), in a memory for future displaying. Thus the data stored in the memory can be displayed even during the off-line state after disconnected from the Internet (off-line browsing).

Further, the user can have its mobile telephone display such obtained e-mails or WEB data during the off-line state (off-line browsing) and then call a telephone number attached thereto in the form of a hyperlink.

Such data-communicable mobile telephone usually has a phone-to function, by which selecting a telephone number being displayed on the screen and then pressing a corresponding button automatically execute a call-out operation for a destination terminal identified by the selected telephone number. Specifically, the user can call up a destination terminal identified by a telephone number, which is attached to the e-mail or WEB data on display, with only a single pressing on a button.

However, in above-mentioned conventional mobile telephone, after the start of the call-out process using the phone-to function (during a call-out process and a succeeding voice-communication process), the entire area of the display is changed over to the state indicating such processes (calling-out state/voice-communication state display). As a result, even if the user makes a call using a hands-free function or a headset, the user cannot manage a voice-communication looking through the source data (the e-mail data or the WEB data), which was displayed prior to the call-out process, because the source data is not displayed after the call-out operation.

Despite a favorable function of displaying data obtained via data communication with respect to the recent mobile telephone, the obtained data is not utilized during voice communication. Consequently, a smooth communication with a communication companion person would occasionally be hard to be realized so that a misunderstanding like the normal telephone communication depending on only voice communication occurs to cause an increased amount of toll.

SUMMARY OF THE INVENTION

With the foregoing problems in view, it is an object of the present invention to provide a mobile radio terminal and a method for displaying data in the mobile radio terminal in which the data displayed prior to a call-out process is displayed after the start of the call-out process using a phone-to function with respect to the destination terminal identified by the telephone number information attached to data obtained via the radio telephone. By this mobile radio terminal, the user can enjoy talking with a companion person at the destination terminal looking through the data displayed on the data display section. As a result, the communication conditions of talking with a companion person can be greatly improved.

To accomplish the above object, according to a first generic feature of the present invention, there is a mobile radio terminal comprising: a memory for storing data with telephone number information attached; a data display section for displaying the data stored in the memory; a call-out operation detecting section for detecting a call-out operation to a destination terminal that is identified by the telephone number information attached to the data being displayed on the data display section; a call-out control section, operative in response to the call-out operation detection of the call-out operation detecting section, for executing a call-out process with respect to the destination terminal based on the telephone number information; and a display control section for controlling the data display section td display the data after the call-out control section starts executing the call-out process.

With the above-mentioned mobile radio terminal, when a call-out operation to a destination terminal that is identified by telephone number information attached to data being displayed on a data display section of the first-named terminal is detected, a call-out process with respect to the destination terminal identified by the telephone number information is automatically executed (the call-out step). Then the data display section is controlled so as to display the data. As a result, the data can be browsed after the start of the call-out process, namely, during the call-out and a voice communication. Accordingly, a smoother communication can be realized with greatly improved communication conditions as compared to a voice-only-communication.

As a preferable feature, in the mobile radio terminal, the display control section may be equipped with redisplay control means, responsive to the start of the call-out process execution of the call-out control section, for controlling the data display section to display a calling-out state and then redisplay the data. Having the redisplay control means, in response to the start of the executing of the call-out process, the data display section is controlled so as to display the calling-out state (the calling-out displaying step) and then to display the data on the data display section (the redisplay step). The user of the mobile radio terminal can acknowledge whether the call-out process is carried out properly before redisplaying the data.

Therefore dialing a wrong number due to the user's mistake or a malfunction of the mobile radio terminal can be avoided.

As another preferable feature, the redisplaying control means performs in response to a display changeover operation after having displayed the calling-out state, and the user manually makes an operation so as to display the data on the data display section at an optional timing after the start of the call-out process.

Accordingly, after the start of the call-out process, the user can make the mobile telephone operative to redisplay data manually whenever the user wishes to, and therefore the handiness of the mobile telephone is realized.

As still another preferable feature, the redisplaying control means is operative in response to the change of the display from the calling-out state to a voice-communication state. As a result, since the data is automatically redisplayed on the data display section in response to the change of display from the calling-out state to a voice-communication state, the data is successfully redisplayed without the user's operation during the voice-communication state, reducing the user's labor to employ the mobile radio terminal.

As a further preferable feature, the mobile radio terminal further comprises a combination display control section, operative in response to the start of the call-out process execution of the call-out control section, for controlling the data display section to assume a combination display state in which the data display section displays the data and a calling-out state in combination. Since the combination display control section allows displaying the data and the calling-out state in combination on the data display section (the combination display step), the user can acknowledge the calling-out state while consulting with the data concurrently.

The user then can enjoy talking with a companion person without pressure of time because of ample time for referring the data on the data display section, and can acknowledge whether the call-out process is carried out properly.

Other objects and further features of the present invention will be apparent from the following detailed description when read in conjunction with the accompanying drawings.

DESCRIPTION OF THE PREFERRED EMBODIMENT

One preferred embodiment of the present invention will now be described with reference to the accompanying drawings.

Figure 1:
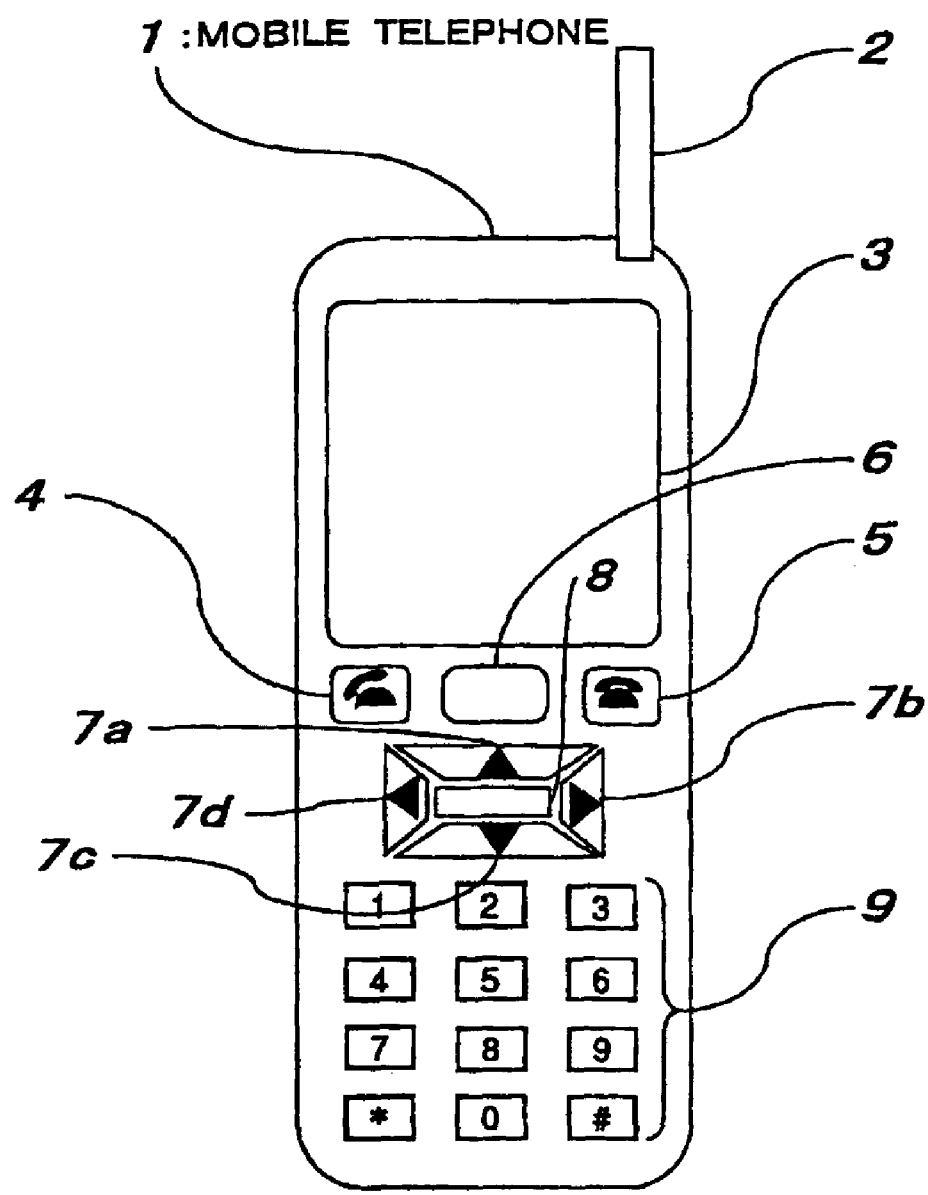
FIG. 1 is a front view schematically showing a mobile telephone (mobile radio terminal) according to one embodiment of the present invention.

FIG. 1 is a front view schematically showing a mobile telephone (mobile radio terminal) 1 according to one embodiment of the present invention. The mobile telephone 1 of FIG. 1 is equipped with an antenna section 2, a liquid crystal display (LCD) 3, a power/talk button 4, a hang-up/hold-on button 5, a display-changeover button 6, cursor buttons 7a through 7d, a decision button 8, and a numeric keypad 9.

The antenna section 2 serves to transmit and receive data, such as audio data of a voice communication, an e-mail of data communication and WEB data in HTML (Hyper Text Markup Language) format for a mobile telephone, via a radio communication system. The data is transmitted and received among the communication apparatuses, such as terminals and telephones, via a public communication network as formed of radio stations and exchangers.

Figure 2:
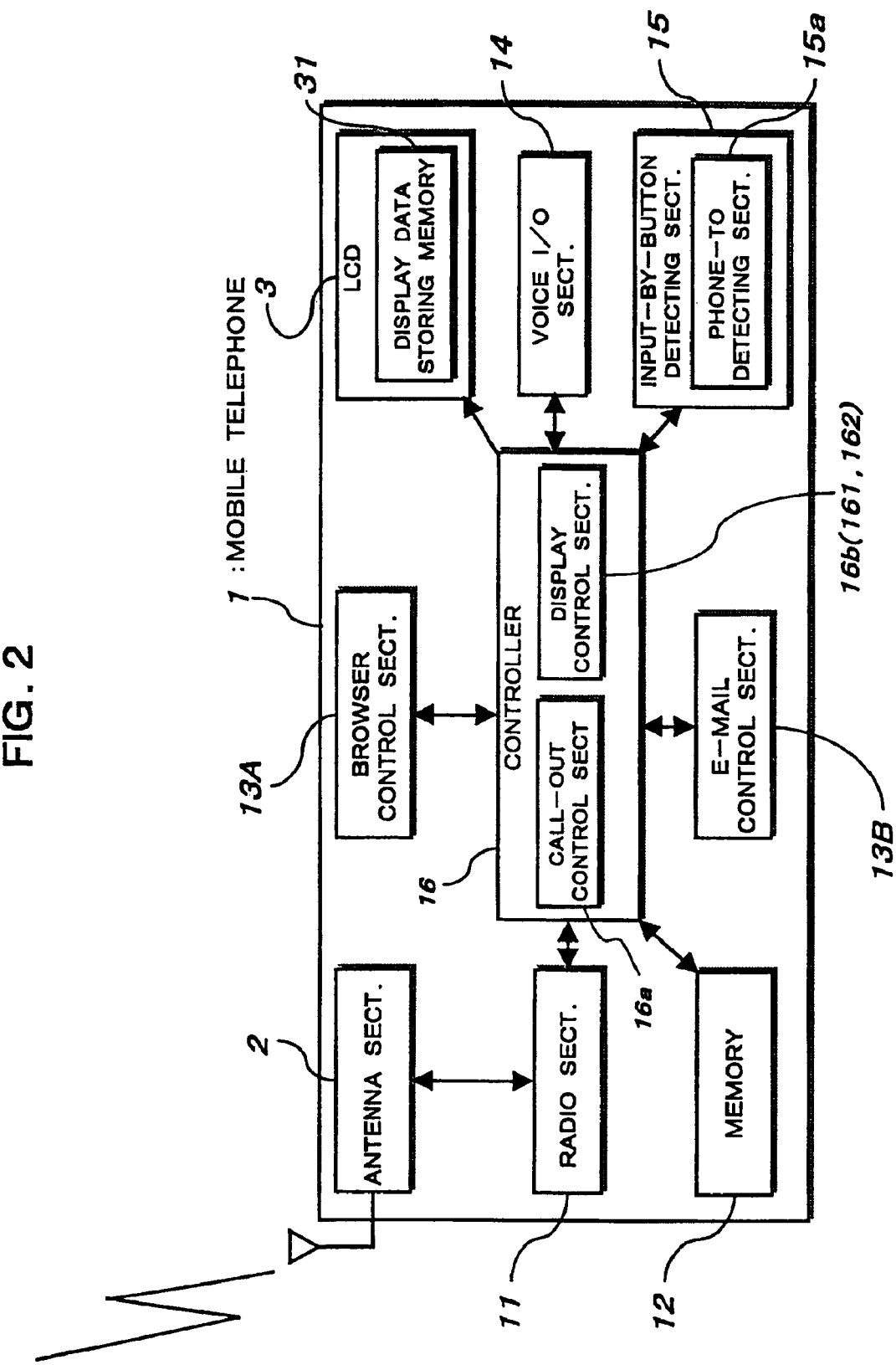
FIG. 2 is a block diagram schematically showing the interior of the mobile telephone of FIG. 1.

The liquid crystal display (LCD; also called data display section, or screen) 3 executes various displays such as received e-mails (hereinafter called the received mails), WEB data, state of transmit/receive and etc. The liquid crystal display 3, as shown in FIG. 2, includes a display data storing memory 31, which temporarily stores data to be displayed. The power/talk button 4 is used for turn on/turn off operations of the mobile telephone 1 and for call-up/ access to a telephone number/a URL inputted from the numeric keypad 9. The hang-up/hold-on button 5 is operated to make selectively disconnection of the mobile telephone 1 from the telephone circuit or a holding-on of the communication.

The display-changeover button 6 is used for display changeover operation of the liquid crystal display (hereinafter called display) 3. In this illustrated example, when the display-changeover button 6 is pressed after a transmitting (call-out) process is executed by a phone-to function, a mail or WEB data which has been displayed before the transmit process is redisplayed on the display 3.

The cursor buttons 7a through 7d are used for moving a cursor in the upward, downward, rightward and leftward directions on the display 3 when a telephone number, a URL, or a menu being displayed on the display 3 is going to be selected. In the illustrated example, moving the cursor by the cursor buttons 7a through 7d selects a telephone number or a URL attached to the data being displayed on the display 3 in the form of a hyperlink. Subsequently, pressing the decision button 8 with respect to the selected telephone number or the URL automatically carries out a call-out (an access) process to the telephone number or the URL.

Namely, the decision button 8 serves both a phone-to button (a button for starting of a voice-communication) for realizing a phone-to function and a browsing button for accessing to a URL, which is attached to an e-mail or WEB data, to browse by a single click.

The numeric keypad 9 is used for inputting telephone numbers and letters. The call-out process/access (data communication) to a telephone number or a URL inputted from the numeric keypad 9 is executed by pressing the power/talk button 4.

For this purpose, the mobile telephone 1 as shown in FIG. 2 is further equipped with a radio section 11, a memory 12, a browser control section 13A, an e-mail control section 13B, a voice I/O (input/output) section 14, an input-by-button detecting section 15, and a controller 16, as internal components in addition to the antenna section 2 and the display 3.

The radio section 11 up-converts the data (audio data, e-mail data or WEB data) to be transmitted to a radio frequency (RF) signal, and then transmits the RF signal. On the other hand, the radio section 11 also down-converts audio data, e-mail data or WEB data received as an RF signal to a baseband signal. The memory 12 stores necessary data, such as the e-mail data or the WEB data obtained by browsing the Internet.

The browser control section 13A controls the browsing of the Internet (an access to a URL). The e-mail control section 13B controls the transmitting and receiving of e-mails. If the mobile telephone 1 enables to only transmit and receive e-mails, the browsing control section 13A is dispensable.

The voice I/O section 14 executes the input/output of voice during a voice communication, being in the form of a microphone, a speaker, etc. Operating buttons in a predetermined manner or connecting a headset to the mobile telephone 1 realizes hands free communication.

The input-by-button detecting section 15 detects whether the individual button, i.e. the power/talk button 4, the hang-up/hold-on button 5, the display-changeover button 6, the cursor buttons 7a through 7d, the decision button 8 or the numeric keypad 9, is operated. The input-by-button detecting section 15 also detects the above-mentioned phone-to operation. Namely, as shown in FIG. 2, the input-by-button detecting section 15 functions as a phone-to detecting section 15a that detects a phone-to operation (selection and succeeding decision operation) with respect to telephone number information attached to the e-mail data or the WEB data being displayed on the data display section 3.

The controller 16 controls the radio section 11, the memory 12, the browser control section 13A, the e-mail control section 13B, the display 3 and the voice I/O section 14 unitedly to thereby control the whole operation of the mobile telephone 1. In the illustrated example, when the input-by-button detecting section 15 (the phone-to detecting section 15a) detects the phone-to operation, the controller 16 functions as a call-out control section 16a to execute a call-out process with respect to the telephone number attached to the data being displayed on the display 3. The controller 16 also functions as a display control section 16b to control the display 3 into a display state, which indicates the state prior to the call-out operation on the display 3, after the start of executing the call-out process by the call-out control section 16a.

Figure 6:
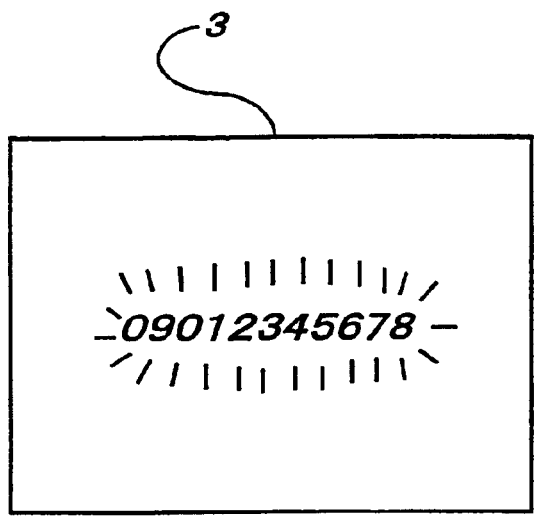
Figure 7:
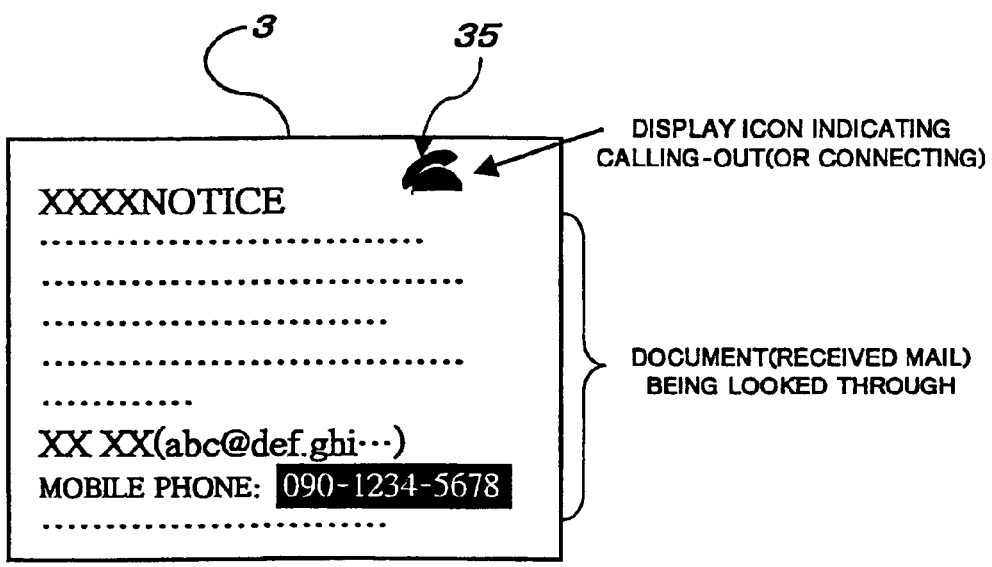

The display control section 16b controls the display 3 to display a calling-out state (flashing the telephone number being calling out as shown in FIG. 6, etc.) in response to the start of call-out process and then to redisplay data being displayed prior to the call-out process. For an alternation, the display control section 16b, responsive to the start of the call-out process, controls the display 3 assume a combination display state in which, with data kept displayed prior to the call-out process, the calling-out state (lighting or flashing an icon as shown in FIG. 7, etc.) is displayed in combination.

Specifically, in response to the start of the call-out process by the call-out control section 16a, the display control section 16b jointly functions as a redisplay control section 161 to control the display 3 to display the calling-out state on the display 3 and then to redisplay data displayed prior to the calling-out state. The display control section 16b functions as also a combination display control section 162 that controls the display 3 to assume a combination display state in which, in response to the start of the call-out process by the call-out control section 16a, a calling-out state and either one of e-mail data or WEB data are displayed on the display 3 in combination.

The foregoing individual functions are respectively realized by dedicated or shared software. Upon the start of the call-out process, the data displayed is temporarily stored in the display data storing memory 31 for future redisplay or combination display. The display manner, either the redisplay or the combination display, may be set by the user's choice as "redisplay mode" and "combination display mode".

The control of the display state (a display changeover) by the redisplay control section 161 during the "redisplay mode" can be executed at the time when the input-by-button detecting section 15 detects a depression of the display-changeover button 6 after the start of the call-out process or at the time when the controller 16 conforms a changeover to a voice-communication state as a connection to a destination terminal has been established (receiving a signaling message (CONNECT ACK), etc.) after the start of the call-out process.

The operation of the mobile telephone 1 of the illustrated embodiment will now be described.

Figure 3:
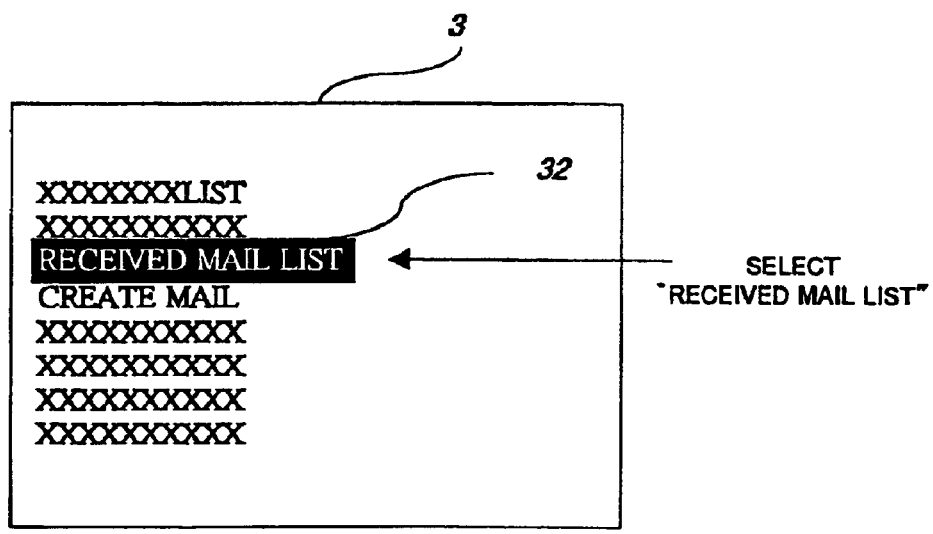
FIGS. 3 through 7 are schematic diagrams showing the screen (of the mobile telephone) on which various kinds of data displays appear according to the embodiment.
Figure 4:
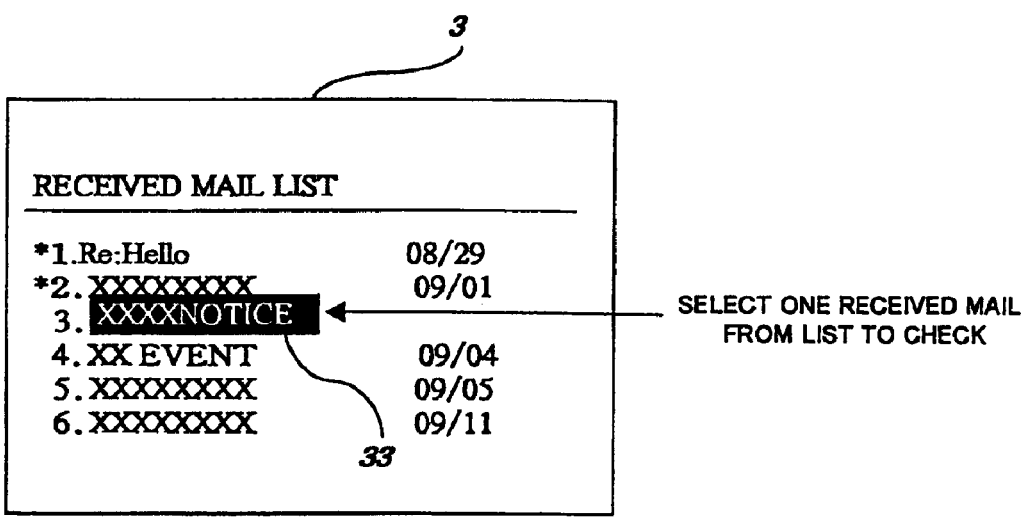
Figure 5:
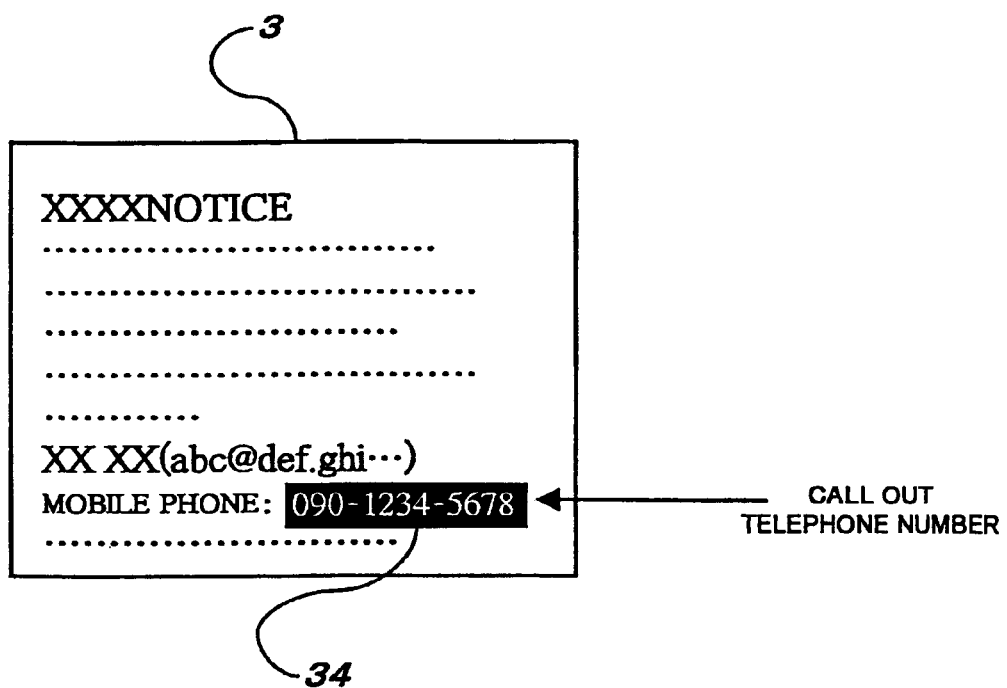

First of all, when the user of the mobile telephone 1 selects "received mail list" (a reverse display part 32) in the menu display of FIG. 3, the received mail list shown in FIG. 4 is displayed. Then, the user selects one received mail (a reverse display part 33) in the list to check (to be displayed), the controller 16 fetches the correspond received mail data from the memory 12 to output the fetched data to the display data storing memory 31 in the display 3. As a result, the received mail data is displayed on the display 3 as shown in FIG. 5.

In the illustrated example, the destination telephone number (of a mobile telephone) of the sender of the received mail is attached to the received mail in the form of a hyperlink (a reverse display part 34). When the user of the mobile telephone 1 selects the telephone number using the cursor buttons 7a through 7d and then operates the decision button (phone-to button) 8, a call-out operation is carried out with respect to the destination terminal identified by the telephone number.

Figure 8:
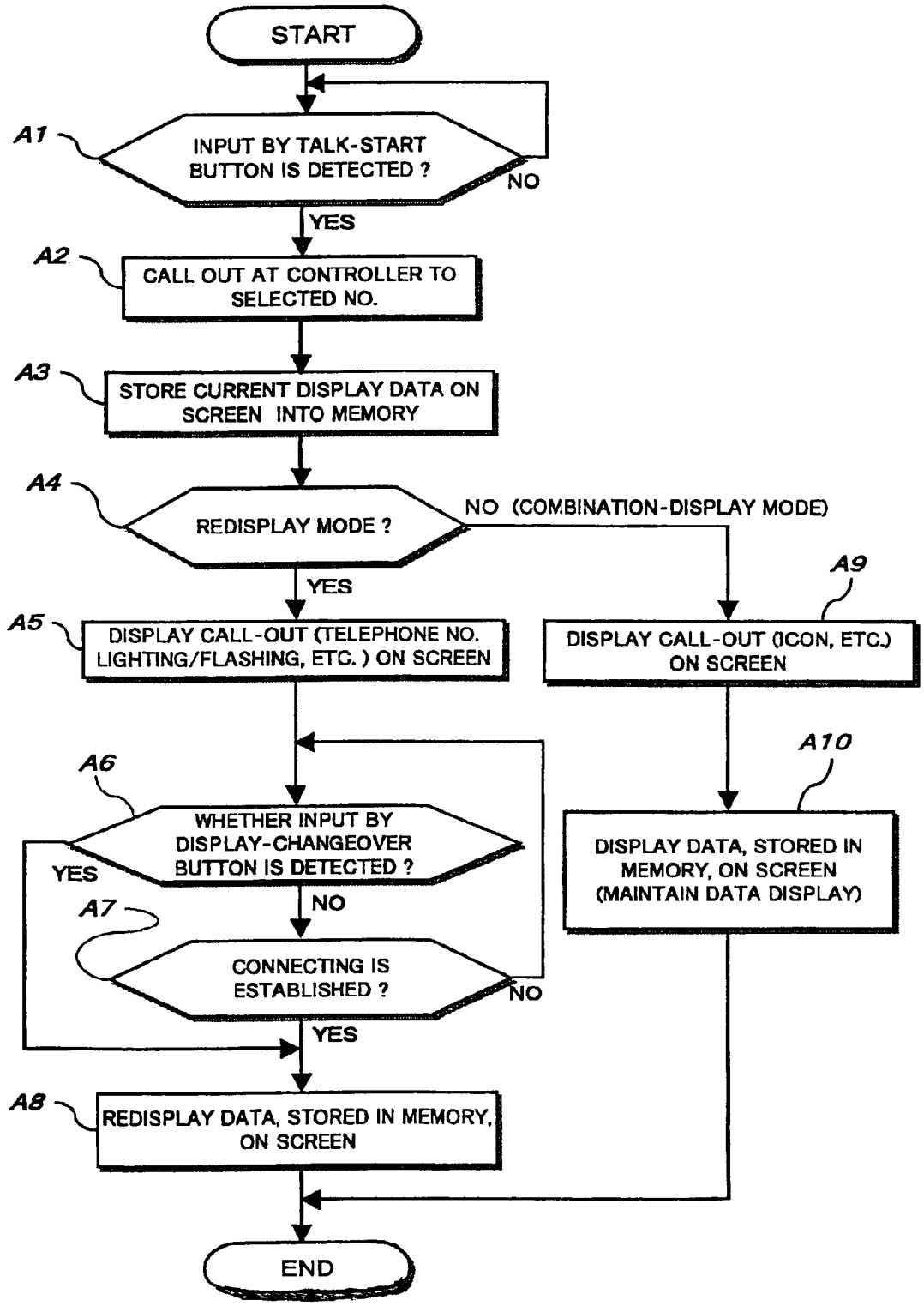
FIG. 8 is a flow chart showing the procedure in which the data is displayed on mobile telephone according to the embodiment.

Consequently, in the mobile telephone 1, the input-by-button detecting section 15 monitors whether or not the phone-to button 8 is pressed (NO route in step A1) as shown in FIG. 8. When the input-by-button detecting section 15 (the phone-to detecting section 15a) detects that the phone-to button 8 has been pressed (YES route in step A1; the selection and decision detecting step), the controller 16 (the call-out control section 16a) executes (starts) the call-out operation with respect to the selected telephone number (step A2; the call-out step).

Accordingly, the controller 16 controls the display control section 16b to store current display information (e-mail data in the example of FIG. 5) on the display 3 into the display data storing memory 31 (step A3), whereupon the controller 16 acknowledges either "redisplay mode" or "combination display mode" having been set with respect to the mobile telephone 1 (step A4).

When the "redisplay mode" has been set, the redisplay control section 161 in the display control section 16b, as shown in FIG. 6, controls the display 3 so that the calling-out state (lighting/flashing the telephone number being call-out) is displayed on the display 3 (YES route from step A4 to step A5; the displaying the calling-out state step) Since lighting/flashing the telephone number being call-out enables to confirm whether the call-out with respect to the destination terminal is carried out properly, an error call-out, such as dialing a wrong number, can be avoided.

Subsequently, the controller 16 monitors whether or not the input-by-button detecting section 15 detects the display-changeover button 6 is pressed (NO route of step A6) and whether or not the connection to the destination terminal is established (No route of step A7). When the input-by-button detecting section 15 detects a depression of the display-changeover button 6 by the user (YES route in step A6) before establishing the connection to the destination terminal (before judged as YES in step A7), or when the connection is established (YES route in step A7) before the input-by-button detecting section 15 detects a depression of the display-changeover button 6 by the user (before judged as YES in step A6), the redisplay control section 161 redisplays data stored in the display data storing memory 31 on the display 3 (step A8; the redisplay step).

Specifically, the user of the mobile telephone 1 makes a manual operation to redisplay data prior to the call-out process on the display 3, pressing the display-changeover button 6 between the start of the call-out process and the establishment of the connection. On the other hand, the user allows an automatic operation to redisplay data, without pressing the display-changeover button 6 until establishing the connection. As a result, the redisplaying is streamlined with improved convenience and sufficiency at the user's intention. Since data displayed prior to the call-out process is redisplayed when the connection to the destination terminal has been established to assume a voice-communication state in either case, the user surely can make voice communication with a companion person looking through the data on the display 3.

Meanwhile, when the controller 16 detects that the "combination mode" has been set (NO route in step A4), the combination display control section 162 keeps displaying, as shown in FIG. 7, data displayed prior to the call-out process, and additionally displays an icon 35 indicating the calling-out state in combination (steps A9 and A10; the combination display step). In this mode, since the user can acknowledge the calling-out state looking through the =received mail on the source terminal, a wrong operation due to user's mistake can be prevented. Additionally, other advantageous results, such as ample time is given to refer to the received mail, are attained. Therefore the user can concentrate on talking with a companion person on the destination terminal (the sender of the received mail).

Since the mobile telephone 1 displays the data displayed prior to the call-out operation on the display 3 using the phone-to function or the like with respect to the telephone number information attached to the received mail after the start of the call-out process, the user can talk with a companion person of the destination terminal looking through the data of the source terminal. Accordingly, with the illustrated mobile telephone 1, possible misunderstandings between the communication subscribers during a voice communication can be reduced, and a smoother communication can be realized as compared to a voice-only-communication. As a result, it is possible to improve telephone communication conditions to a great extent as the amount of time and the cost for a voice-communication is reduced.

Telephone number information is attached to e-mail data in the illustrated example. Alternatively, the telephone number information may be attached to the WEB data and other data format, as long as only the telephone number can be attached to the data and the call-out process is triggered by the phone-to function or the like. Further, the mobile telephone 1 of the illustrated embodiment is equipped with two different buttons to function as the decision button (the phone-to button) 8 and the display-changeover button 6. In an alternative, the functions of the decision button 8 and the display-changeover button 6 may be executed using one common button. In another alternative, one common button can serve to perform two or more of the above-mentioned functions.

The destination telephone number in the calling-out state is lighting/flashing on the display 3 in the "redisplay mode" in the illustrated example. However, the telephone number in the calling-out state may be lighting/flashing in the "combination display mode" as a substitute for displaying the icon 35 in the FIG. 7. In this manner, possible dialing a wrong number can be avoided in either of the "redisplaying mode" and the "combination display mode". In still another alternative, an icon indicating not only the calling-out state but also a voice-communication state may be displayed in combination with the data on the display 3.

If the size of the e-mail data to be displayed exceeds the capacity of display on the display 3 at once and if to display the whole e-mail data requires more than one page, the whole e-mail can be looked through, subject to storing the e-mail data in the display data storing memory 31 and changing over the current page to another page using the cursor buttons 7a through 7d and the display-changeover button 6.

Further, when such excessive data is redisplayed or displayed in combination, either the page the user had been looking through upon the start of the call-out process or a particular page, such as the leading page, can be automatically displayed. Alternatively, numbers of e-mail data (WEB data) can be stored into the display data storing memory 31 for alternate display using the display-changeover button 6, and both e-mail data and WEB data can be also alternately displayed by the display-change over button 6.

In the illustrated example, the mobile telephone 1 can have the "redisplay mode" and the "combination display mode", form which one can be selected for use. The present invention should by no means be limited to having these two modes, and may have only one of these two modes. For this purpose, the mobile telephone 1 may have either one of the redisplay control section 161 or the combination display control section 162. In the "redisplay mode" of the illustrated example, when the connection to the destination terminal is established, the display prior to the call-out process is redisplayed. In an alternative, only the display-changeover button 6 may be depressed for redisplaying. Namely, redisplay may be always done by the user's manual operation irrespective of establishing connection.

Furthermore, the mobile telephone 1 is in the form of a mobile radio terminal in the illustrated example. Alternatively, the present invention may be applied to other kinds of mobile terminals, such as a PDA, as long as they are voice-communicable using radio.

In the present invention, various changes or modifications may be suggested without departing from the gist of the invention.

What is claimed is:

1. A mobile radio terminal comprising:
    a memory storing data, received via a wireless line, having a hyperlink of telephone number information;
    a data display section displaying the data stored in said memory;
    an operation detecting section detecting an operation of the hyperlink in the state of the data being displayed on the data display section but no voice communication being executed;
    a call control section, operative in response to the operation detection of said operation detecting section, executing a call-out process for establishing voice communication with respect to a destination terminal that is identified by the telephone number information; and
    a display control section controlling said data display section to display at least a part of the data having the hyperlink, while at least one of executing the call-out process and executing voice communication with the destination terminal by said call control section.

2. A mobile radio terminal according to claim 1, wherein said display control section is equipped with redisplay control means, responsive to the start of the call-out process execution by said control section, for controlling said data display section to display a calling-out state and then redisplay the data.

3. A mobile radio terminal according to claim 2, wherein the redisplaying of the data by said redisplaying control means is performed in response to a display changeover operation after displaying the calling-out state.

4. A mobile radio terminal according to claim 2, wherein the redisplaying of the data by said redisplaying control means is performed in response to a change to a voice-communication state after displaying the calling-out state.

5. A mobile radio terminal comprising:
- a memory storing data, received via a wireless line, having attached a hyperlink of telephone number information;
- a data display section displaying the data stored in said memory;
- an operation detection section detecting an operation of the hyperlink in the state of the data being displayed on said data display section but no voice communication being executed;
- a call control section, operative in response to the operation detection of said operation detecting section, executing a call-out process for establishing voice communication with respect to a destination terminal that is identified by the telephone number information; and
- a combination display control section, while at least one of executing the call-out process and executing voice communication with the destination terminal, controlling said data display section to provide a combination display state in which said data display section displays in combination at least a part of the data having the hyperlink and a calling-out state.

6. A method of displaying data on a mobile radio terminal, comprising the steps of:
- (a) detecting an operation of a hyperlink of telephone number information of data, received via a wireless line, in the state of the data being displayed on a data display section of the mobile radio terminal but no voice communication being executed;
- (b) upon detection of the operation in step (a), executing a call-out process for establishing voice communication with respect to a destination terminal that is identified by said telephone number information; and
- (c) while at least one of said executing of the call-out process in step (b) and executing voice communication with the destination terminal, displaying at least a part of the data having the hyperlink on the data display section.

7. A data display method according to claim 6, wherein step (c) includes:
- (c1) in response to the start of said executing of the call-out process, displaying a calling-out state on the data display section; and
- (c2) redisplaying the data on the data display section after said displaying in step (c1).

8. A data display method according to claim 7, wherein said redisplaying in step (c2) is performed in response to a display changeover operation after said displaying in step (c1).

9. A data display method according to claim 7, wherein said redisplaying in step (c2) is performed in response to a change to a voice-communication state after said displaying in step (c1).

10. A method of displaying data on a mobile radio terminal, comprising the steps of:
- (a) detecting an operation of a hyperlink of telephone number information of data, received via a wireless line, in the state of the data being displayed on a data display section of the mobile radio terminal but no voice communication being executed;
- (b) upon detection of the operation in step (a), executing a call-out process for establishing voice communication with respect to a destination terminal that is identified by said telephone number information; and
- (c) while at least one of said executing of the call-out process in step (b) and executing voice communication with the destination terminal, controlling the data display section to provide in a combination display state in which the data display section displays in combination at least a part of the data having the hyperlink and a calling-out state.

* * * * *